July 31, 1962 E. S. CRUZ 3,047,093
FOLDABLE STAIRWAY FOR AIRCRAFT
Filed April 2, 1958 5 Sheets-Sheet 1

INVENTOR.
EDWARD S. CRUZ
BY
George C. Sullivan
Agent

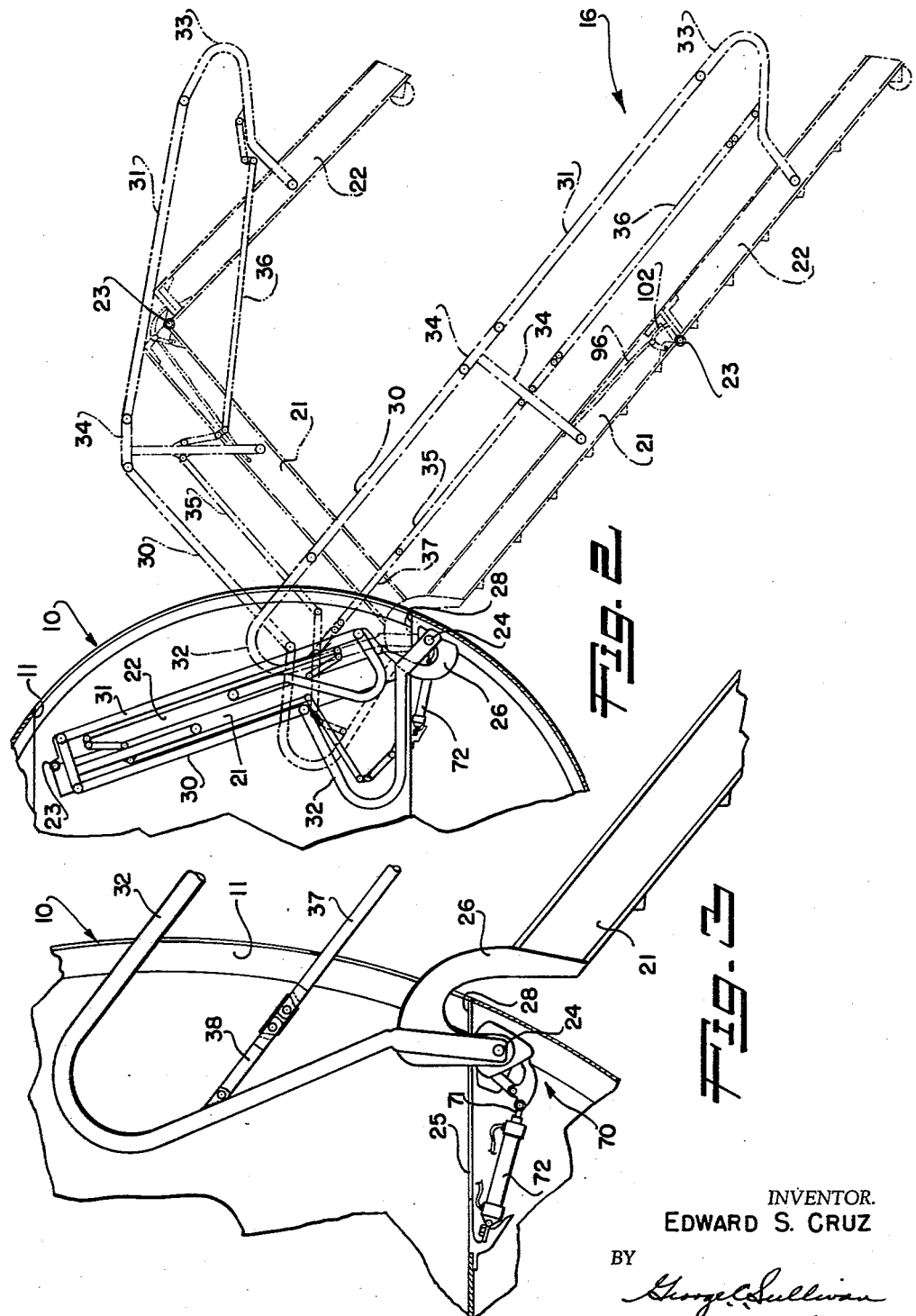

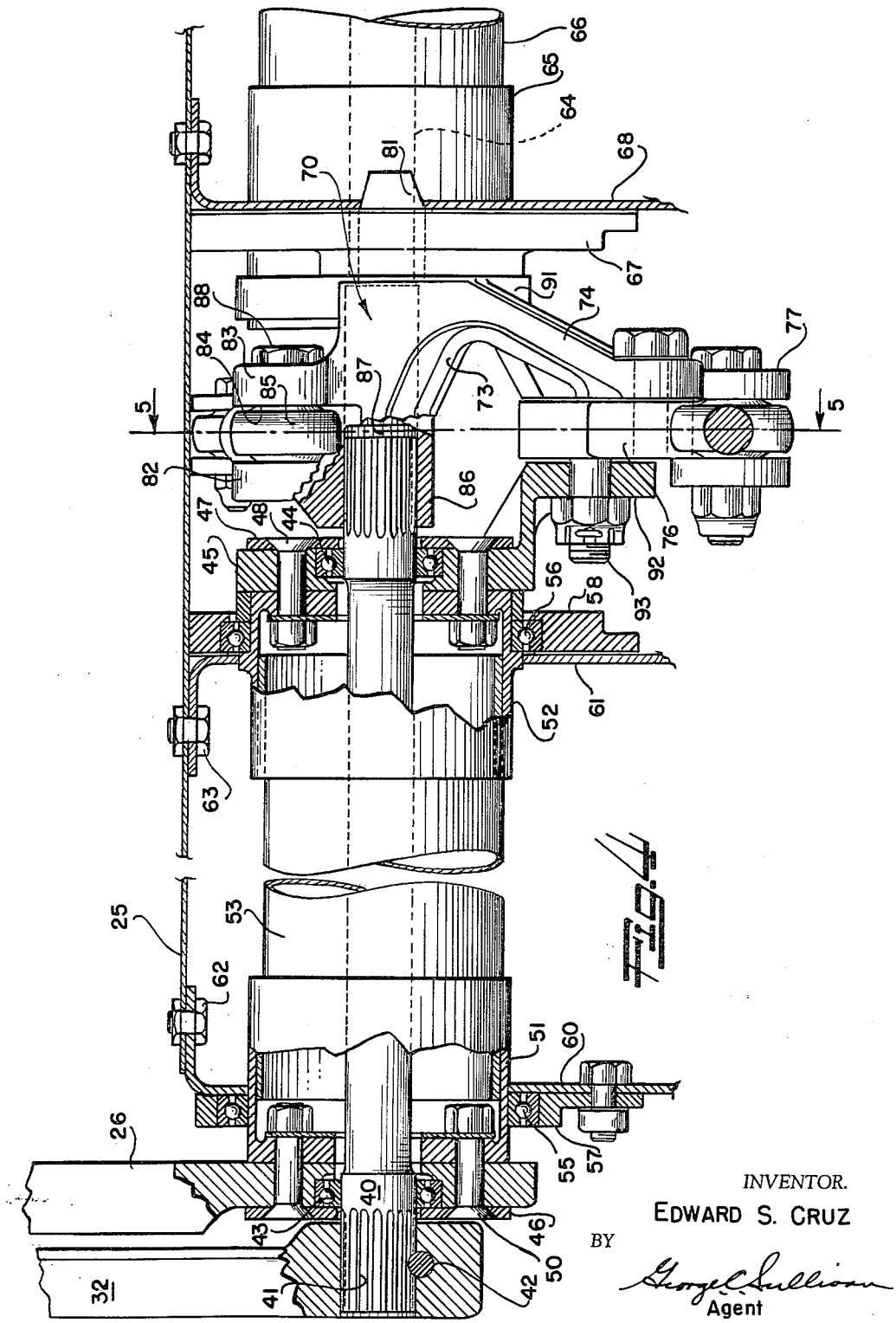

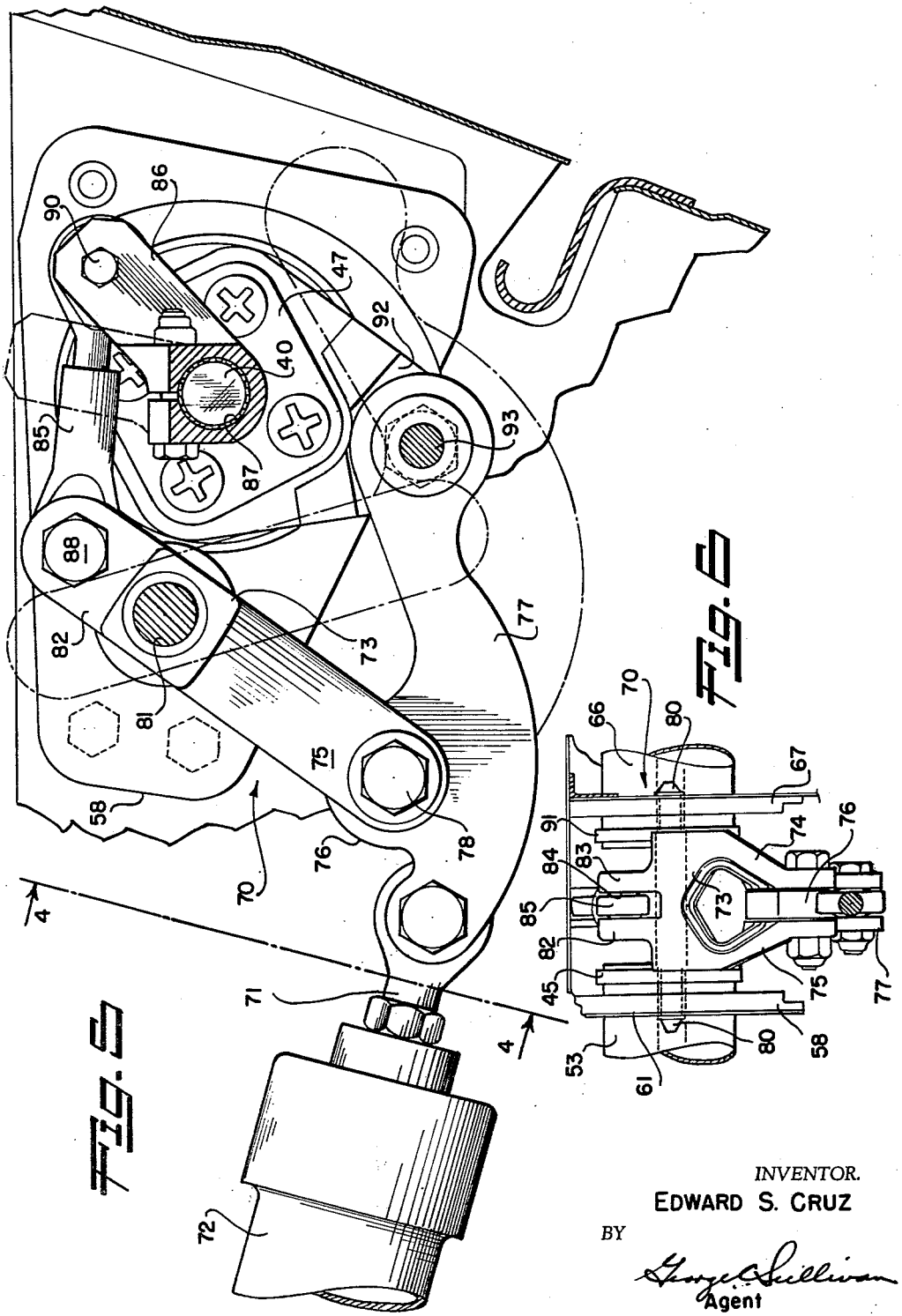

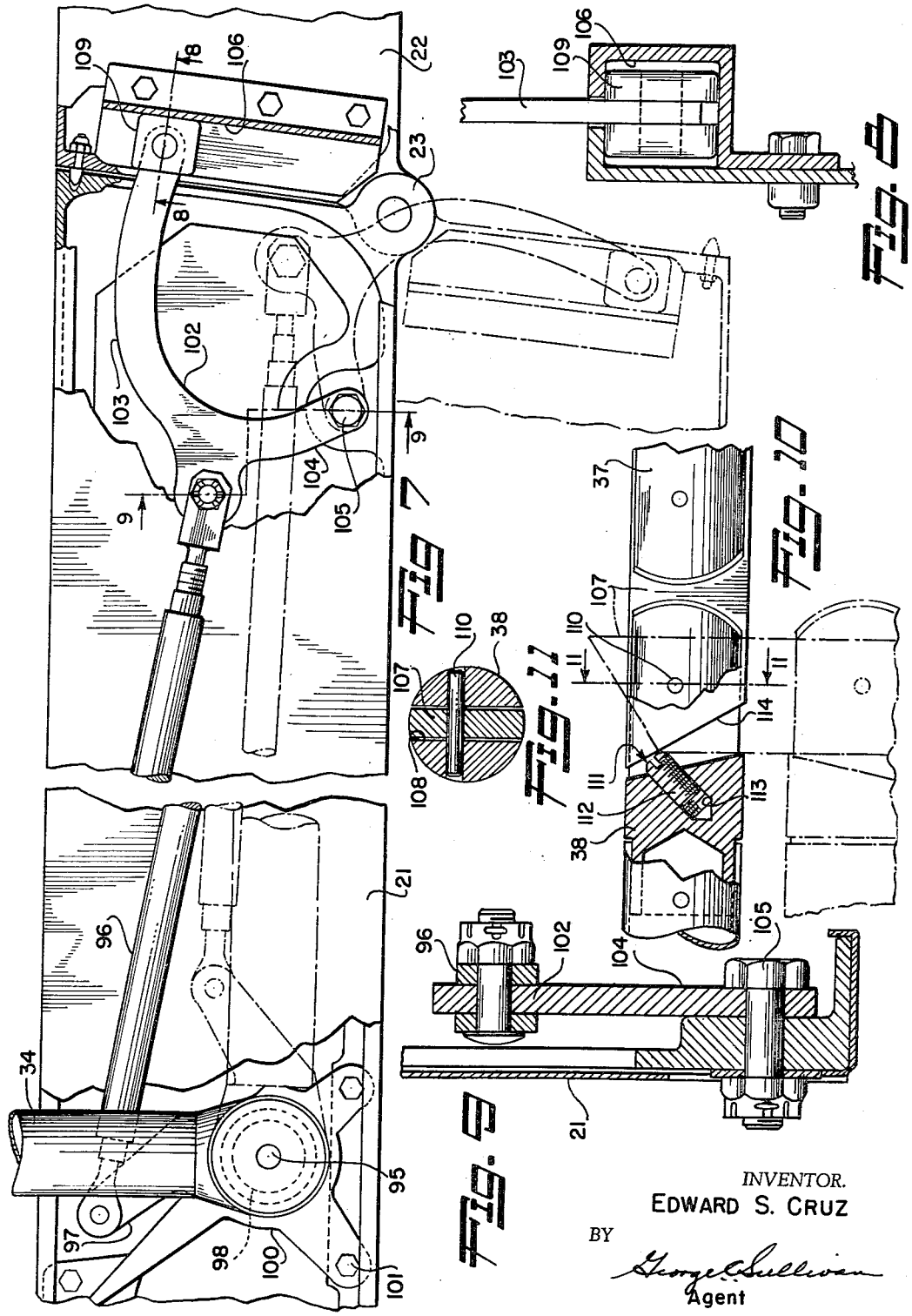

United States Patent Office 3,047,093
Patented July 31, 1962

3,047,093
FOLDABLE STAIRWAY FOR AIRCRAFT
Edward S. Cruz, Van Nuys, Calif., assignor to Lockheed Aircraft Corporation, Burbank, Calif.
Filed Apr. 2, 1958, Ser. No. 725,872
5 Claims. (Cl. 182—97)

This invention relates to a foldable stairway for an airplane and more particularly to an improved means whereby passenger access to and egress from the interior of the airplane may be had.

Present day commercial passenger carrying airplanes are relatively large and are continually increasing in size. Floor levels of such large airplanes when the latter are at rest on the ground, are at a substantial distance from the ground making necessary a stairway means so that passengers may readily have access to and egress from the interior of airplane.

Conventional practice employs the use of relatively large and cumbersome specially constructed ramps or gangplanks which are detachably connected to the aircraft adjacent the door for passenger use. This type of ramp usually provides rigid hand-rails for the convenience of the passengers and is of sturdy construction to offer adequate support for several passengers at one time. However, more recent practice has included the use of a folding stairway carried by the airplane pivotally mounted adjacent the airplane door which is lowered and raised to and from the ground respectively.

Difficulties have been encountered when employing conventional foldable stairways intended to be carried with the airplane which stems largely from the fact that the hand-rails are not usually rigid when the stairway is extended and secondly, in those instances where the hand-rails are made rigid, the packaging of the folded stairway is quite bulky and cumbersome. Furthermore, conventional foldable stairways for aircraft do not provide for means controlling the retraction of each section of the stairway in a positive fashion as the stairway is folded into the storage well provided in the airplane. This inadequacy allows the outermost sections of the stairway to flounder or swing freely. Another difficulty is found in the means for translating the force generated by an actuator into a controllable system whereby the stairway sections and foldable hand-rails are folded at a differential rate.

These difficulties are overcome in accordance with the present invention wherein a foldable stairway for an airplane is contemplated which provides rigid hand-rails when the stairway is extended and which pivots the hand-rails in accordance with folding sections of the stairway so that a compact package requiring minimum stowage space in the fuselage of the airplane is provided. The hand-rail lengths and the stairway sections are folded simultaneously at a differential rate. Furthermore, mechanical linkage connects the sections of the stairway with the stairway actuator mechanism so that each section is under controlled retraction at all times during the folding or unfolding of the stairway.

Therefore, it is an object of the present invention to provide a novel foldable stairway carried by an airplane which forms a relatively small, compact package in its folded condition having various lengths of hand-rail assemblies lying in a substantially parallel plane.

Another object of the present invention is to provide rigid hand-rails on a foldable stairway in its extended position which pivot relative to the stairway when the stairway is folded or unfolded so that the folded hand-rails lie in a substantially parallel plane with the stairway in its stowed position.

Still another object of the present invention is to provide a novel means included in a foldable stairway for an airplane which maintains direct control over the various sections of the stairway during folding and unfolding operations so that no section is permitted to swing freely.

Still another object of the present invention is to provide torsion means for receiving various loads during retraction and extension operations of the folding stairway and transmitting these loads to the structure of the airplane.

Another object of the present invention is to provide a stairway which maintains its rigidity while adjusting to varying ground heights. By employing torque means to take up applied loads, the problems encountered in indexing the airplane to ground surface are obviated.

A further object of the present invention is to provide a mechanical linkage between the hand-rails and the stairway sections operable by the folding stairway actuator to open and close the distance between the hand-rails and stairway frame as the stairway is unfolded or folded. Such linkage including torque shafts and/or tubes which twist at a differential rate to simultaneously fold the hand-rails and stairway sections.

These and other objects will be more readily apparent from a reading of the following specification taken in connection with the accompanying drawings wherein:

FIGURE 2 is a side view of the stairway of FIGURE 1 shown in its folded position in solid lines within a storage compartment of the airplane and in its extended and intermediate position shown in broken lines;

FIGURE 3 is a side view of a stairway actuator for advancing and retracting the stairway of FIGURE 2;

FIGURE 4 is a partial sectional view of a mounting mechanism for the stairway of FIGURE 2 including forced transmitting linkages. This figure is taken in the direction of arrows 4—4 of FIGURE 5;

FIGURE 5 is a side view of the stairway actuator means including force transmitting linkages taken in the direction of arrows 5—5 of FIGURE 4;

FIGURE 6 is an elevational view of the force transmitting linkages that are partially shown in FIGURE 5;

FIGURE 7 is an enlarged side view of a mechanical linkage for controlling the retracting of the stairway sections;

FIGURE 8 is a sectional view of a slide and guide track of the mechanical linkage taken in the direction of arrows 8—8 of FIGURE 7;

FIGURE 9 is a sectional view of a control link of the mechanical linkage of FIGURE 7 taken in the direction of arrows 9—9;

FIGURE 10 is a sectional view showing an adjustment means for determining the proper relationship between adjacent pivoting links of the hand-rail assembly wherein the adjacent links are in an "in-line" relationship as shown in solid lines and are in a folded relationship as shown in broken lines;

FIGURE 11 is a sectional view of connecting adjacent links of the hand-rail assembly taken in the direction of arrows 11—11 of FIGURE 10.

Figure 1:
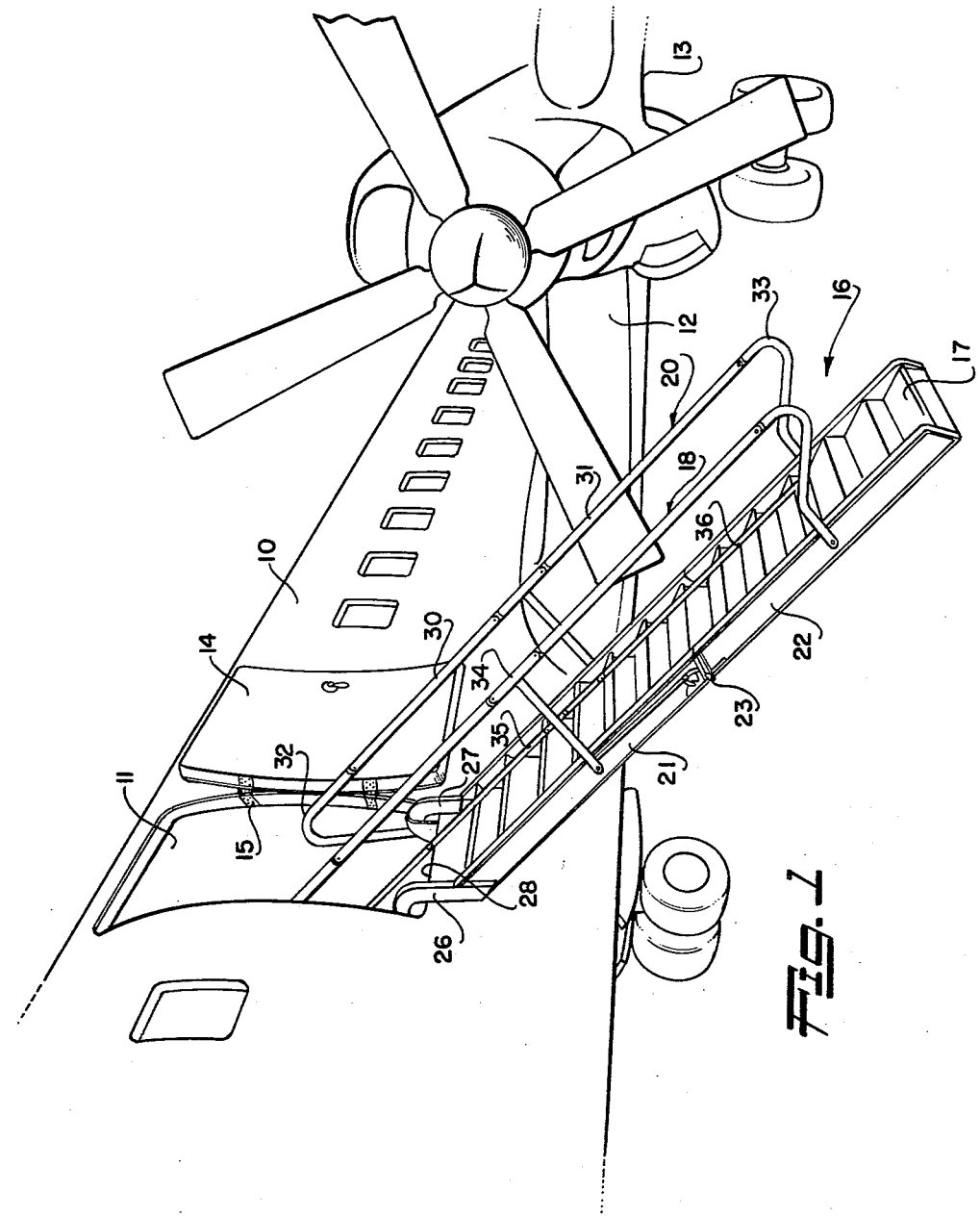
FIGURE 1 is a fragmentary perspective view of a fuselage of an airplane illustrating a door opening in the side of the fuselage and the foldable stairway, in accordance with the present invention, in its extended passenger loading or unloading position.

With reference to FIGURES 1 and 2, there is shown an airplane fuselage 10, of conventional design, having a doorway or door opening 11 provided in the side thereof to permit access to the interior of the airplane at the forward end of the passenger compartment and forward of a leading edge 12 of an airplane wing 13. A door 14 is provided for closure of the doorway 11 and is pivotally mounted by suitable hinge means 15, provided at its side edge, to the fuselage 10 and is adapted to be swung outwardly from the fuselage to an open position. As seen in FIGURE 1, the door 14 is shaped in such a manner that it conforms to the contour of the fuselage 10 when in its closed position.

Extending from the doorway and leading into the interior of the fuselage is a stairway 16 for permitting persons to ascend to the ground or to enter the airplane. The stairway 16 comprises, in general, a plurality of conventional steps 17 and a pair of parallel extending hand-rail assemblies 18 and 20 which are located on either side of the steps 17 in a parallel relationship. The stairway 16 is formed into two principle sections, 21 and 22, with lower section 22 resting upon the ground and being hinged to upper section 21 at hinge 23. Section 22 is foldable against section 21 when the stairway 16 is actuated to its stowed position within the fuselage 10 as shown in FIGURE 2.

The section 21 is rotatably supported on the fuselage from its upper end by means of a pair of hooks 26 and 27 secured to the upper end of section 21 which loop or hook over the doorway sill 28 of the fuselage. Construction in this manner provides an adequate transition from the series of steps 17 to the passenger compartment floor 25 so that the last step in this series falls short of the sill 28 equal to the distance between adjacent steps of the series.

An important feature of the present invention resides in the pair of hand-rail assemblies 18 and 20 which when in the fully extended position of the stairway represents a rigid support for the convenience of passengers using the stairway and when the stairway in its folded position, as shown in FIGURE 2, the hand-rails are folded or rearranged into a compact package within the doorway 11. Each hand-rail assembly, such as assembly 18, comprises in general, an upper and a lower member 30 and 31 associated with section 21 and 22 of the stairway 16 and a pair of end members 32 and 33 which connect the extreme opposite ends of members 30 and 31 substantially above the stairway steps. This arrangement is given further support by employing a T shaped support member 34 which is pivotally carried by section 21 of the stairway and which suitably connects adjacent opposing ends of members 30 and 31 in a pivoting relationship. Similar to member 34, end members 32 and 33 are pivotally carried by their respective sections of the stairway.

To achieve stability of the hand-rail assemblies and to insure a rigid condition when extended, a mid-rail 35 and 36 is provided midway between the stairway per se and hand-rail members 30 and 31. The mid-rail assembly is composed of a plurality of lengths, such as lengths 37 and 38 for example, pivotally attached in an end to end relationship extending from end member 32 to the T shaped member 34 and therefrom to the end member 33.

With reference to FIGURE 4, member 32 is shown attached to one extreme end of a shaft 40 by means of interlocking splines 41 and a lock-pin 42. Shaft 40 is supported by a pair of bearings 43 and 44 which are retained within a suitable seat provided in hook 26 and a suitable seat provided in a member 45 respectively. Flat pieces 46 and 47 are employed to retain the bearings in their seated positions by means of screw and nut arrangement 48 and 50.

Attachment arrangement 48 and 50 also serves to couple a pair of collars 51 and 52 to the inside surface of hook 26 and member 45 respectively. Suitably connected between the last mentioned collars, there is provided a hollow torque tube 53 which is co-axial with shaft 40 which passes through the interior of the torque tube.

The torque tube including collars 51 and 52 and the shaft 40 including member 32 and hook 26 are rotatably supported by means of a pair of bearings 55 and 56 which mount the collars 51 and 52 and which are seated in a pair of brackets 57 and 58. These brackets are supported by means of a pair of supports 60 and 61 which are in intimate contact with floor 25 being secured thereto by fasteners 62 and 63 for example.

It should be understood that shaft 40 and torque tube 53 including their associated supporting bearings and collars are duplicated respective to hook 27 and the end member associated with hand-rail assembly 20. Such duplication is indicated by the reference numeral 64 which indicates a shaft similar to the shaft 40, a collar 65 which is similar to the collar 52, a torque tube 66 which is similar to the torque tube 53, and a mounting bracket 67 secured to a support 68 which is similar to bracket 58.

Situated between the adjacent opposing ends of shafts 40 and 64 and between the opposing ends of torque tubes 53 and 66, there is provided a force transmitting linkage represented by the general numeral 70, as shown in FIGURE 6, which serves to translate the lineal motion of a piston 71 of a hydraulic actuator 72.

As shown more clearly in FIGURES 4, 5 and 6, the force transmitting linkage comprises in general, a yoke member 73 having a pair of parallel legs 74 and 75 which are received on opposite sides of a protrusion 76 integrally formed in a link 77. A conventional nut and bolt arrangement 78 is employed to couple the pair of legs of yoke 73 in a loose pivoting relationship with protrusion 76. Yoke 73 is further provided with a pair of pivot pins 80 and 81 associated with legs 74 and 75 respectively which are received into bores provided in member 58 and member 67.

Integrally formed on yoke 73 and projecting a direction away from legs 74 and 75, there is provided a set of parallel arms 82 and 83 which provides a channel 84 therebetween suitable for receiving one end of a connecting link 85. Link 85 is connected to an arm 86 which is secured to a splined area 87 on the end of shaft 40 opposite to its end carrying member 32. Connecting link 85 is connected between arms 82 and 83 by a suitable nut and bolt arrangement 88 and to arm 86 by a fastener 90.

Member 45 and a similar member 91, as shown in FIGURE 4, are provided with flanges 92 which are separated by one end of link 77 opposite to the end of the link attached to piston 71. The end of link 77 interposed between flanges 92 of members 45 and 91 is loosely secured to these flanges by means of a pivot fastener 93.

Thus, it can be seen that by actuating piston 71 from actuator 72, link 77 is pivoted about fastener 93 and members 45 and 91 are rotated on their respective bearings. The rotation of member 45, for example, causes torque tube 53 to rotate and to translate its rotary motion to hook 26 so that the stairway can be retracted into its stowed position. The pivoting of link 77 on fastener 93 also causes the force translating mechanism 70 to pivot on pins 80 and 81 so that shaft 40 is rotated via connecting link 85 and arm 86. Inasmuch as the hand-rail assembly associated with end member 32 is attached to shaft 40, its rotational movement is translated into movement of the hand-rail assembly 18. In effect, the yoke 73, link 77, connecting link 85 and arm 86 represent a four-bar linkage arrangement which causes a differential retracting of the stairway per se and the hand-rail assemblies so that the assemblies close toward the stairway sections. However, it should be noted that the present invention includes a positive control for retracting the hand-rail assembly and the stairway sections, in particular, which is achieved by means shown in FIGURES 7 through 9 inclusive.

With reference to FIGURE 7, the stairway and positive control means thereof is shown in its extended position in solid lines and in its retracted position in broken lines. Member 34 is pivotally attached to the side of section 21 at point 95 and pivots in response to rotation of the torque shaft 40 via the movement of member 32 and the mid-rail and hand-rail assemblies. A link 96 is pivotally attached to an arm 97 secured to the member 34 so that the pivotal motion of member 34 can be translated into a lineal motion of link 96. Arm 97 is mounted on a bearing 98 encased on a fixture 100 secured to section 21 by means of a plurality of fasteners, such as fastener 101. The end of link 96 opposite to its end attached to arm 97 is pivotally attached to a C shaped member 102, having a pair of arms 103 and 104, at a location substantially between the pair of arms. The C shaped member 102 is pivotally fixed to stairway 21 by a nut and screw arrangement 105.

Arm 103 projects beyond the end of section 21 of the stairway and is in communication with section 22. As shown in FIGURE 8, arm 103 is provided with a glide member 109 which is enclosed within a track means 106 secured to section 22 of the stairway. The guide track 106 comprises an elongated aperture suitable to receive the glide member 109 so that as section 22 folds about hinge 23, its rate of fold is under constant control of link 96 and member 34. Thereby, section 22 is restricted from floundering or swinging freely.

With reference to FIGURE 10, the pivotal arrangement between adjacent opposing ends of the hand-rail or mid-rail is shown wherein the ends of rails 37 and 38 are pivotally connected by a member 107 which is interposed within a slot 108 provided in each end of the rail as shown in FIGURE 11. A pin 110 serves to connect member 107 with its associated rail length. An adjustment means 111 is provided as a stop means in order to maintain the adjacent rails substantially straight and in a rigid condition upon full extension of the stairway. This means includes a screw 112 which may be adjusted into or out of a bore 113. A butting surface 114 of member 107 comes into contact with screw 112 upon extension of the stairway sections.

Actual operation will be described with the assumption that stairway 16 is in its extended passenger loading position as shown in broken lines of FIGURE 2. Initially, actuator 72 is operated by a conventional hydraulic system (not shown) which causes piston 71 to advance from actuator 72. The advancement of piston 71 causes link 77, as shown in FIGURE 5, to pivot about fastener 93 and causes member 45 and 91 to rotate on their respective bearings, such as bearing 56 associated with member 45. The advancement of piston 71 positions link 77 to assume the position of the link as shown in broken lines. The rotation of member 45, for example, causes torque tube 53 to rotate via collar 52. The rotation of torque tube 53 tends to twist because of the load placed on the tube by the stairway sections connected to the tube by collar 51 via hook 26. This loading of torque tube 53 is transferred to the structure of the fuselage 10 through bearings 55 and 56 and plates 57 and 58 to mount 60 and 61.

As rotation or twisting of torque tube 53 continues, hook 26 causes sections 21 and 22 of stairway 16 to pivot upward about the doorsill 28 and causes section 22 to break contact with the ground surface. As the stairway continues to rise above the surface of the ground, the normal tendency of stairway section 22 is to rotate about hinge 23. However, the hinge movement of section 22 with respect to section 21 is under control of linkage, to be described later.

The pivoting of link 77 on fastener 93 also causes the forced translating mechanism 70 to pivot on pin 80 and 81 into the position shown in broken lines in FIGURE 5. The pivoting of link 77 causes shaft 40 to rotate via connecting links 85 and arm 86 on bearings 43 and 44. Inasmuch as the hand-rail assembly associated with end member 32 is attached to shaft 40, the rotational motion of shaft 40 is translated into movement of the hand-rail assembly 18 so that the folding of the hand-rail and mid-rail assemblies are under direct control at all times and are not dependent upon the normal folding of stairway sections 21 and 22 to effect folding.

Inasmuch as the rotation of torque tube 53 and the rotation of torque shaft 40 occur at a different rate of speed, stairway sections 21 and 22 may be folded at a rate greater than the folding of mid-rail and hand-rail assemblies. The difference in the rate of rotation, permits the hand-rail and mid-rail assemblies to fold adjacent one another and adjacent the stairway sections to effect a compact package.

As the hand-rail and mid-rail fold in accordance with the twisting or rotation of torque shaft 40, T shaped member 34 is rotated about point 95, as shown in FIGURE 7, from its upright position shown in solid lines to its reclined position as shown in broken lines when stairway section 22 has been folded adjacent stairway section 21. The pivoting motion of member 34 is transferred to a lineal motion of link 96 which, in effect, directly controls the hinge movement of section 22 about hinge point 23 via the glide member 109 slidably engaged in track 106. Inasmuch as a substantial portion of the weight load of section 22 is placed directly on the control linkage, a portion of this load is distributed via C shaped member 102 to section 21 via arm 104 pivotally attached to section 21. Also, a substantial portion of the weight load of section 22 is distributed via link 96 to arm 97 and member 34 and to the shaft 40 via the hand-rail and mid-rail assemblies.

As shown in FIGURE 2 in solid lines, the stairway is completely retracted and stowed within a compartment within the fuselage of the airplane. The folded package is characterized by the substantially parallel arrangement of the hand-rail and mid-rail assemblies which are folded in close proximity and substantially adjacent to one another.

In order to extend stairway 16, actuator 72 is actuated to withdraw piston 71 into actuator 72 which causes link 77 to travel in a direction opposite to the action previously described with the resultant consequence of torque tube 53 and torque shaft 40 rotating or twisting in an opposite direction to cause the extension of the stairway sections and hand-rail assemblies.

Having described only a typical form of the invention, I do not wish to be limited to the specific details herein set forth, but wish to reserve to myself any variations or modifications which may appear to those skilled in the art and fall within the scope of the following claims.

I claim:

1. Passenger loading steps for aircraft comprising, a frame pivotally secured at one end thereof to the aircraft and having a plurality of steps formed therein, a second frame pivotally secured to the opposite end of the first mentioned frame and having a plurality of steps formed therein, linkage means pivotally attached to the first mentioned frame connecting with the second frame for controlling the pivotal movement of the latter frame between an extended position generally aligned with the first mentioned frame and a stowed position wherein the frames are folded back against each other, actuating means operatively connected to the first mentioned frame for swinging the frames relative to the aircraft between the extended position and the stowed position, a segmental handrail composed of rigid segments pivotally carried at one end to the aircraft and pivotally connected to both the first and second frames, and means connecting the actuating means to the handrail so that the handrail and the frames fold at a differential rate.

2. The invention as defined in claim 1 wherein the linkage means comprises, a rod pivotally attached to the extendable end of the first frame and having a C shaped member pivotally secured on one end of the rod, the C shaped member connected to the second frame in a pivoting and sliding relationship so that the load of the second frame is transferred to the first frame via the rod.

3. Passenger loading steps for aircraft comprising, a first frame having a plurality of steps formed therein, a second frame pivotally secured to one end of the first mentioned frame and having a plurality of steps formed therein, a first torque tube secured to the aircraft for pivotally connecting the first frame to the aircraft, a segmental handrail composed of rigid segments pivotally carried on the first and second frames, a second torque tube coaxial with the first torque tube and connected to the handrail and rotatably secured to the aircraft and serving to pivotally connect the handrail to the aircraft, and actuating means carried by the aircraft connected with the first and second torque tubes for swinging the frames relative to the aircraft between a passenger loading position outside the aircraft and a stowed position inside the aircraft via the first and second torque tubes.

4. The invention as defined in claim 3 including a rod pivotally attached to the extendable end of the first frame and having a C shaped member pivotally secured on one end of the rod, the C shaped member having an arm which is slideably and pivotally connected to the second frame for controlling the swinging of the second frame relative to the first frame between the extended position and the stowed position of the frames.

5. The invention as defined in claim 3 wherein the actuating means is connected to the first and second torque tubes by means permitting the rigid handrail and the frames to be folded at a differential rate.

References Cited in the file of this patent

UNITED STATES PATENTS

| | | |
|---|---|---|
| 2,523,723 | Santee et al. | Sept. 26, 1950 |
| 2,531,263 | Fink et al. | Nov. 21, 1950 |
| 2,662,681 | Stapleton | Dec. 15, 1953 |
| 2,812,528 | Odell | Nov. 12, 1957 |
| 2,933,149 | Lee | Apr. 19, 1960 |

FOREIGN PATENTS

| | | |
|---|---|---|
| 1,024,366 | Germany | Feb. 13, 1958 |